United States Patent Office 2,824,101
Patented Feb. 18, 1958

2,824,101
3-ANILINO-2H,1,4-BENZOTHIAZINES

Markus Zimmermann, Riehen, Switzerland, assignor to G. D. Searle & Co., Chicago, Ill., a corporation of Delaware No Drawing. Application September 13, 1956
Serial No. 609,541

6 Claims. (Cl. 260—243)

This invention relates to anilino derivatives of 2H,1,4-benzothiazin-3(4H)-one of the formula

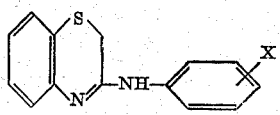

and acid addition salts thereof wherein X is hydrogen, halogen, hydroxy or lower alkoxy.

The compounds of the invention are prepared by reacting aniline or an appropriate derivative thereof with 3-bromo or 3-chloro-2H,1,4-benzothiazin-3(4H)-one. The reaction may be carried out as desired with or without the use of inert diluents such as benzene, toluene, carbon tetrachloride, ethylene dichloride and the like and at room temperatures but preferably at moderately elevated temperatures such as the reflux temperatures of the inert diluents.

Alternatively, the compounds of the invention are obtained by reacting together 2H,1,4-benzothiazin-3(4H)-one, an agent such as phosphorous tribromide or trichloride and the appropriate aniline with or without inert diluent as desired and preferably at moderately elevated temperature.

The product of the reaction is isolated as desired either as the free base or in the form of its acid addition salts.

For isolation as the free base, the reaction mixture is diluted with water, made alkaline and extracted with a volatile solvent such as ether. After drying, the solvent is removed and the residue crystallized to yield the free base.

Acid addition salts of the free base are prepared by dissolving the base in a solvent such as ethanol, ethyl acetate, isopropanol or mixtures thereof and adding excess isopropanolic solution of the desired acid. Suitable acids are the hydrohalogen acids such as hydrochloric or hydrobromic and acids such as sulfuric, acetic, citric, tartaric and the like.

In addition to aniline, suitable derivatives thereof may be used and are selected from substituted anilines e. g. the halogenated anilines such as ortho- and para-chloro- or bromoanilines, 2,4-dichloroaniline, p-acyloxy esters of aniline such as p-acetoxyaniline and p-lower alkoxyanilines.

The compounds of the invention are valuable because of their desirable pharmacological activity as spasmolytic agents. In addition, 3-anilino-2H,1,4-benzothiazine promotes the excretion of sodium and thus serves as a sodium diuretic. The compounds are relatively insoluble in water but are readily soluble in common solvents such as alcohol, ether, benzyl alcohol and the like. They may be administered orally in tablet form or may be given parenterally.

The examples which follow illustrate the invention in greater detail but it is to be understood that the invention is not limited thereto. In the examples, parts by weight bear the same relation to parts by volume as kilograms to liters. Temperatures are expressed in degrees centigrade.

Example 1

3.2 parts by weight of 2H,1,4-benzothiazin-3(4H)-one, 1.9 parts by volume of aniline and 25 parts by volume of phosphorous trichloride are mixed while cooling with ice. The mixture is then warmed to 70–80° for about 4 hours. The reaction mixture is poured on ice, made alkaline with saturated sodium carbonate solution, extracted with ether, the ether extract dried with sodium sulfate and the ether evaporated off. The residue is recrystallized from aqueous ethanol with the use of decolorizing carbon to yield 3-anilino-2H,1,4-benzothiazine, M. P. 165–168°.

By substituting m-chloroaniline for the aniline used above there is obtained 3-(m-chloroanilino)-2H,1,4-benzothiazine, M. P. 151–153°.

By substituting 3 grams of p-acetoxyaniline for the aniline used above there is obtained 3-(p-acetoxy-anilino)-2H,1,4-benzothiazine. 3-(p-hydroxyaniline)-2H,1,4-benzothiazine is obtained by dissolving the acetoxy derivative in alcohol containing a small quantity of sodium ethylate and allowing the mixture to stand for 3 hours at room temperature, weakly acidifying with hydrochloric acid, adding ethyl acetate, filtering to remove the precipitated sodium chloride and evaporating off the solvent.

Example 2

6.5 parts by weight of 2H,1,4-benzothiazin-3(4H)-one, 5.3 parts by volume of o-chloroaniline and 25 parts by volume of phosphorous trichloride are mixed white cooling and then heated at 75° for three hours. The reaction mixture is quenched in ice, the mixture made alkaline, extracted with ether, the ether extract dried over sodium sulfate and the ether removed. The residue is dissolved in ethanol-ethyl acetate to which is added excess isopropanolic hydrogen chloride. After standing overnight, the precipitate is filtered off and recrystallized from ethanol-ethyl acetate to yield 3-(o-chloroanilino)-2H,1,4-benzothiazine hydrochloride, M. P. 146–150°.

By substituting p-anisidine for the o-chloroaniline used above, there is obtained 3-(p-methoxyanilino)-2H,1,4-benzothiazine hydrochloride, M. P. 208–210° (dec.).

What is claimed is:

1. A compound selected from the group consisting of compounds having the formula

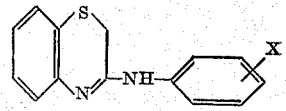

and non-toxic acid addition salts thereof wherein X is selected from the group consisting of hydrogen, halogen, hydroxy, (lower alkyl)COO— and lower alkoxy.

2. 3-anilino-2H,1,4-benzothiazine.
3. 3-(o-chloroanilino)-2H,1,4-benzothiazine hydrochloride.
4. 3-(m-chloroanilino)-2H,1,4-benzothiazine.
5. 3-(p-hydroxyanilino)-2H,1,4-benzothiazine.
6. 3-(p-methoxyanilino)-2H,1,4-benzothiazine hydrochloride.

References Cited in the file of this patent

Beilstein: "Organische Chemie," vol. 27 (1937), page 188.